March 1, 1966 W. A. KUHRT 3,237,400
TURBOROCKET ENGINE
Filed April 5, 1957
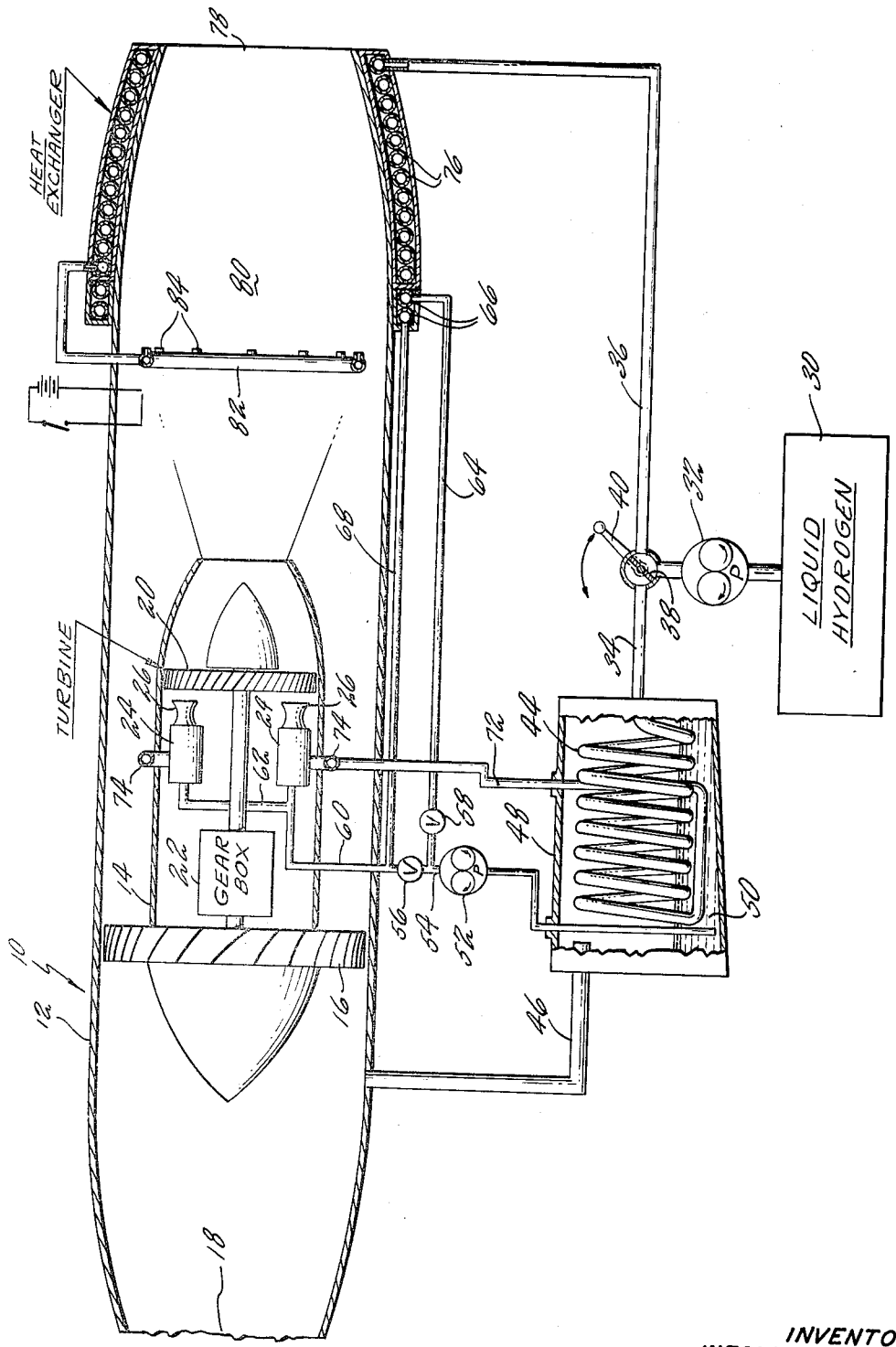
INVENTOR
WESLEY A. KUHRT
BY Leonard F. Welsh
ATTORNEY 3,237,400
TURBOROCKET ENGINE
Wesley A. Kuhrt, East Glastonbury, Conn., assignor to United Aircraft Corporation, East Hartford, Conn., a corporation of Delaware
Filed Apr. 5, 1957, Ser. No. 650,913
2 Claims. (Cl. 60—35.6)

This invention relates to turbine type power plants and more specifically to combined turbine and rocket power plants.

It is an object of this invention to utilize a high energy fuel which is normally gaseous but is stored as a liquid at extreme low temperatures. The fuel such as liquid hydrogen may be used to liquefy a supply of air. The cycle of this invention further provides for burning gasified hydrogen or similar fuel at rich mixture with the air in a rocket type combustion chamber to produce gases for driving a turbine. The turbine drives a fan which compresses air for subsequent burning with the exhaust gases from the turbine in the main combustion chamber of the power plant.

These and other objects of this invention will become readily apparent from the following detailed description of the drawing which illustrates in partial cross section and schematically the power plant and cycle of this invention.

Referring to the drawing, a turbine type power plant is generally indicated at 10 as having an outer casing 12 and inner body 14 which supports a single or multistage compressor or fan 16. Air enters the inlet 18 which receives air from a suitable supersonic inlet and is compressed by the fan 16 which in turn is driven by a single or multi-stage turbine 20 through a reduction gear 22.

The power plant of this invention is a combination rocket type power plant and turbofan combination. Thus primarily a plurality of rocket combustion chambers 24 are provided and are located within the inner body 14. Exhaust nozzles 26 of the rocket chambers cause gases to impinge on the single or multi-stage turbine 20 which in turn drives the fan 16. As hereinafter described, the gases emitted from the rocket chamber nozzles 26 are rich such that further burning exists downstream of the inner body when the air from the fan 16 mixes with the exhaust gases from the turbine. Thus there will be a certain amount of free hydrogen being exhausted from the turbine.

Liquid hydrogen may be stored in a tank 30 and is fed to the power plant combustion chambers by the high pressure pump 32. The flow from the pump 32 may flow to either or both of a pair of lines 34 and 36. The relative amount of flow to the lines 34 and 36 may be controlled by a suitable valve 38 controlled by a manual lever 40 or other suitable automatic means. The lands on the valve are smaller than the ports so that fuel can be flownig to both the lines 34 and 36 simultaneously. The flow of the line 34 passes through a heat exchange coil 44 which has air from the line 46 passing thereover for the purpose of liquefying the air. A container 48 is provided for collecting the liquid air 50 at the bottom thereof. It is known that liquid hydrogen is at such extreme low temperatures that the air from the secondary line 46 will be liquefied within the chamber 48. The liquid air is pumped by a high pressure pump 52 to the line 54. If liquid air is to be fed to the rocket combustion chambers 24, the valve 56 is open, the valve 58 is closed so that a liquid air flows to the lines 60 and 62. In the event that it is desired to gasify the liquid air, the valve 56 may be closed, and the valve 58 may be open, so that there is a flow through the line 64 through the heat exchange coils 66 and back to the line 68 and then to the lines 60 and 62 leading to the rocket combustion chambers 24.

The liquid hydrogen which is fed through the heat exchange coils 44 is gasified therein such that gaseous hydrogen is fed to the line 72 leading to the distributor ring 74 and the rocket combustion chambers 24.

Liquid hydrogen from the tank 30 is also passed in amounts, as desirable, to the line 36 which leads to the heat exchange coils 76 which surround the exhaust nozzle 78 of the power plant and a portion of the main combustion chamber 80. The liquid hydrogen is gasified in the heat exchanger coils 76 and is emitted from the combined fuel distributor and flameholders 82 which carries a plurality of nozzles 84 thereon.

Thus it is seen that the amount of fuel burned in the rocket combustion chambers may be adjusted to obtain the desired turbine temperature at the upstream end of the combustion chamber and/or turbine power as well as a control of temperature. More fuel may be emitted via the nozzles 84 where downstream thereof higher temperatures are permissible due to the fact that the aft end of the combustion chamber and the exhaust nozzle are surrounded by a heat exchanger.

It is apparent that as a result of this invention a high output power plant has been provided which can produce this power at high efficiency and low weight. This is an aircraft turbo-rocket power plant which provides its own supply of oxidizer thus reducing the specific fuel consumption below the high values associated with other turbo-rocket powered aircraft which must carry its own oxidizer.

Although only one embodiment of this invention has been illustrated and described herein, it will be apparent that various changes and modifications may be made in the construction and arrangement of the various parts without departing from the scope of this novel concept.

What is claimed is:

1. In a power plant having a ram air inlet and a compressor, a turbine for driving the compressor, a main combustion chamber receiving air from said compressor, an exhaust nozzle receiving gases from said combustion chamber, a primary combustion chamber upstream of said main combustion chamber, a source of low temperature liquid hydrogen, a secondary air passage connected to said ram air inlet, first heat exchange means receiving air from said secondary passage and liquid hydrogen from said source, said heat exchange means liquefying said air and gasifying said hydrogen, a reservoir for collecting the liquid air, a second heat exchanger means adjacent said main combustion chamber, valve means for selectively conducting said liquid air from said reservoir through said second heat exchanger means and also directly from said reservoir to said primary combustion chamber, means for conducting air from said second heat exchanger to said primary combustion chamber, means for directing an excess of hydrogen from said first heat exchanger to said primary combustion chamber to produce gases to drive said turbine whereby some free hydrogen is exhausted from said turbine, pipe means connected to said hydrogen source, and a valve in said pipe means for directing a portion of the hydrogen to said first heat exchanger and directing further hydrogen to said main combustion chamber to mix with the air from said compressor.

2. A power plant according to claim 1 including means for passing said further hydrogen through said second heat exchanger prior to directing it to said main combustion chamber.

References Cited by the Examiner

UNITED STATES PATENTS 2,602,289 7/1952 Anxionnaz et al. ___ 60—39.46 X

FOREIGN PATENTS 736,486 6/1943 Germany.
749,009 5/1956 Great Britain.

MARK NEWMAN, *Primary Examiner.*
SAMUEL FEINBERG, *Examiner.*
ARTHUR M. HORTON, *Assistant Examiner.*